Sept. 20, 1955  R. P. SHAWD, JR  2,718,185
ROTARY CULTIVATOR SHIELD
Filed July 8, 1952  2 Sheets-Sheet 1

Ralph P. Shawd, Jr.
INVENTOR.

Sept. 20, 1955      R. P. SHAWD, JR      2,718,185
ROTARY CULTIVATOR SHIELD
Filed July 8, 1952      2 Sheets-Sheet 2
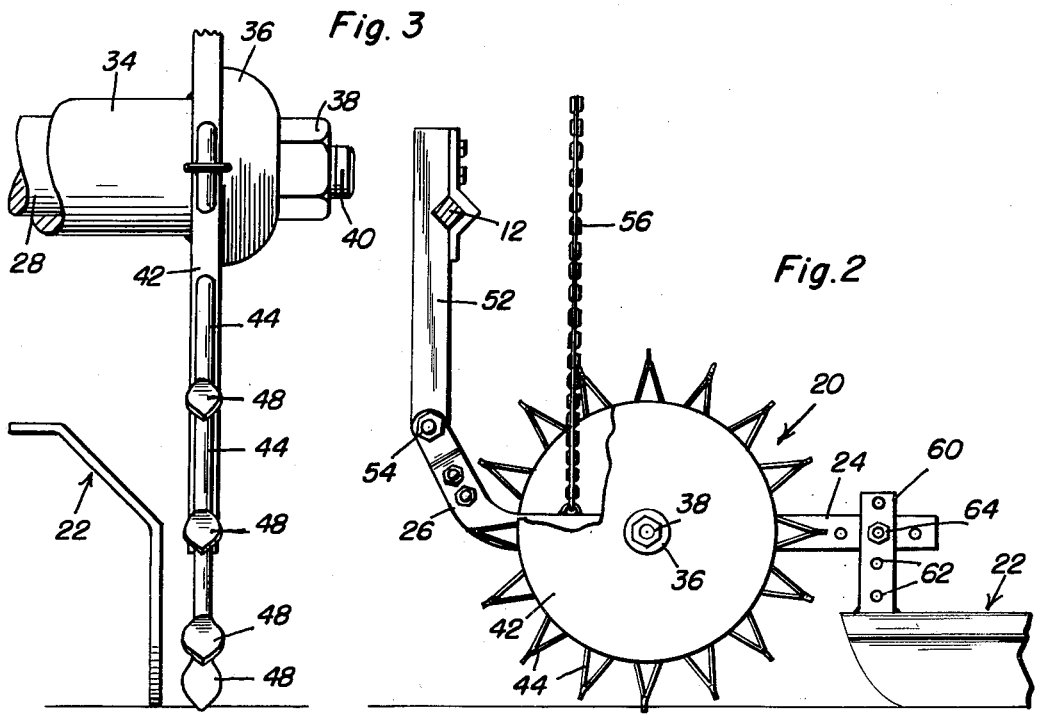
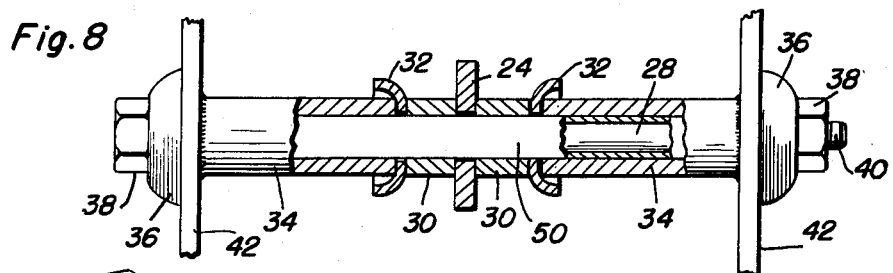
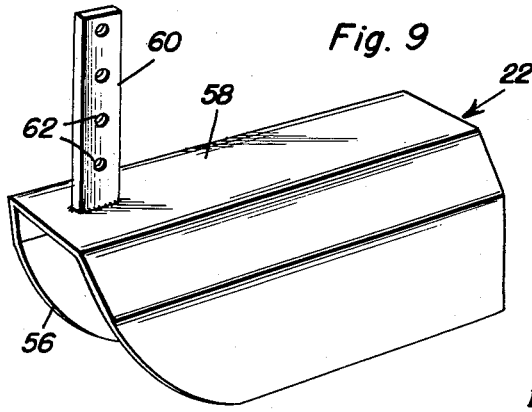
Ralph P. Shawd, Jr.
INVENTOR.

United States Patent Office 2,718,185
Patented Sept. 20, 1955

2,718,185

ROTARY CULTIVATOR SHIELD

Ralph P. Shawd, Jr., Letcher, S. Dak.

Application July 8, 1952, Serial No. 297,625

2 Claims. (Cl. 97—188)

This invention relates in general to farm implements, and more particularly to a rotary cultivator shield.

The primary object of this invention is to provide an improved rotary cultivator shield adapted to be utilized in combination with a conventional cultivator and be positioned adjacent the innermost shovels of the cultivator for protecting small plants during a cultivating operation.

Another object of this invention is to provide an improved rotary cultivator shield which includes a pair of wheels having outwardly projecting spurs thereon, said wheels being adapted to be positioned adjacent the innermost cultivator shovels of a cultivator and protect young crops from damage due to the uprooting of trash by the cultivator and piling of loose dirt on the small crops.

Another object of this invention is to provide an improved rotary cultivator shield which is pivotally connected to a hitch, said hitch being adapted to be mounted on a tractor drawbar whereby the cultivator shield is drawn behind the same and is independently suspended whereby it may be elevated independently of an associated cultivator to clear rocks or other obstructions.

A further object of this invention is to provide an improved cultivator combination which includes a conventional cultivator having two sets of shovels, the first set of shovels having associated therewith the rotary cultivator shield for protecting young crops and the second set of shovels having associated therewith a hood-type shield for preventing the piling of dirt on the young crops by the cultivator shovels, said hood-type shield being drawn by the rotary cultivator shield.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 2 is an enlarged side elevational view of the shield assembly and shows the manner in which it is connected to a drawbar of a tractor, the cultivator and the rear portion of the hood-type shield being omitted and a portion of one of the rotary cultivator wheels being broken away in order to show the manner in which a lifting chain is connected to a support therefor;

Figure 3 is an enlarged fragmentary front elevational view of the shield assembly and shows the relationship of one of the rotary cultivator wheels with respect to one side of the hood-type cultivator shield;

Figure 8 is a fragmentary rear elevational view of the central portion of the rotary cultivator shield with the middle portion thereof broken away and shown in section in order to clearly illustrate the general construction of the rotary cultivator shield, there being added spacers to increase the width of the cultivator shield; and, Figure 9 is an enlarged perspective view of the hood-type cultivator shield and shows the general arrangement thereof.

Similar characters of reference designate similar or identical elements and portions throughout the specification and through the different views of the drawings.

Figure 1:
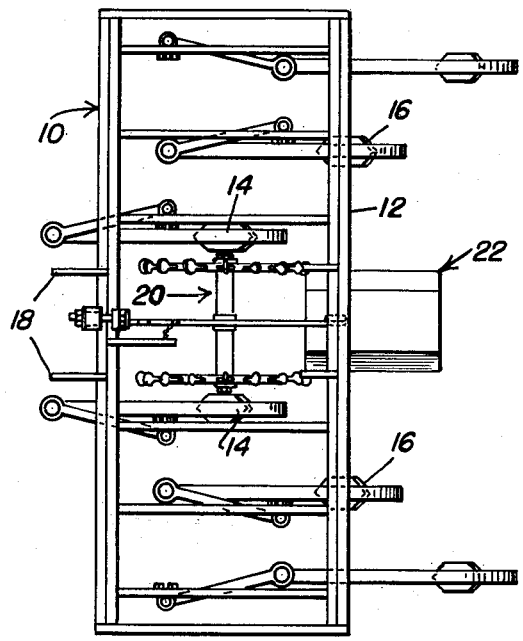
Figure 1 is a top plan view of a conventional cultivator which includes first and second sets of shovels, said cultivator having associated therewith the shield assembly, which is the subject of this invention, the shield assembly including the rotary cultivator shield and the hood-type cultivator shield which are drawn in tandem.

Referring now to the drawings in detail, it will be seen that there is illustrated in Figure 1 a conventional cultivator, which is referred to in general by the reference numeral 10. The cultivator 10 includes a generally rectangular frame 12 which has mounted thereon a plurality of sets of shovels, each set of shovels including a spaced pair of the same which are in transverse alignment. The sets of shovels include a first set of shovels 14, which are the innermost and forward shovels, and a second set of shovels 16 which are disposed rearwardly and outwardly of the first set of shovels 14. The forward end of the frame 12 is provided with a pair of forwardly extending arms 18 which are adapted to be connected to a tractor towbar.

In order that small plants in a young crop may not be hurt during an initial cultivating operation, the first set of shovels 14 have positioned adjacent the same in transverse alignment therewith a rotary cultivator shield, which is referred to in general by the reference numeral 20 and is the subject of this invention. The small plants of a crop are further protected by a hood-type cultivator shield, which is referred to in general by the reference numeral 22 disposed rearwardly of the rotary cultivator shield 20 and positioned in transverse alignment with the second set of cultivator shovels 16. It will be understood that the shields 20 and 22 are designed to prevent the piling of loose earth on young plants during the cultivating operation.

Referring now to Figures 2 and 8 in particular, it will be seen that the rotary cultivator shield 20 includes a longitudinally extending support arm 24 which has an upwardly and forwardly sloping front portion 26. The support arm 24 is in the form of a flat rectangular bar and has carried thereby a transversely extending shaft 28. The shaft 28 has mounted thereon on opposite sides of the support arm 24 a pair of spacers 30 which space collars 32 from the support arm 24. Carried on the shaft 28 adjacent each of the collars 32 are elongated tubular hubs 34 which rotate about the shaft 28. Disposed adjacent the outer end of each of the hubs 34 is a collar 36, the collar 36 being engaged by a nut 38 threadedly engaged on the outer threaded end 40 of the shaft 28 with which it is associated. It will be understood that the nuts 38 retain the hubs 34 on the shaft 28. While the shaft 28 has been described as having threaded end portions 40, it will be understood that, if desired, the shaft 28 may be in the form of an elongated bolt and that one of the nuts 38 may be in the form of the head of the same. The shaft 28 is provided with a sleeve bearing 50 to facilitate rotation of the collars 32 and 36.

Figure 4:
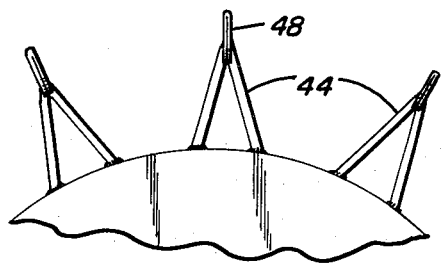
Figure 4 is an enlarged fragmentary side elevational view of the upper portion of one of the wheels of the rotary cultivator shield and shows the general arrangement of spurs attached thereto in circumferentially spaced relation.

Carried by each of the hubs 34 is an enlarged circular plate forming a wheel 42. The wheel 42 has secured to its peripheral edge a plurality of spurs 44, as is best illustrated in Figure 4, the spurs 44 being circumferentially spaced.

Figure 5:
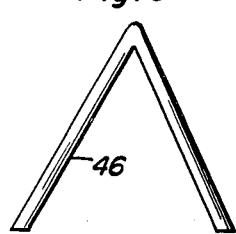
Figure 5 is an enlarged side elevational view of a length of metal rod bent to V-shape in the first step of forming one of the spurs illustrated in Figure 4.
Figure 6:
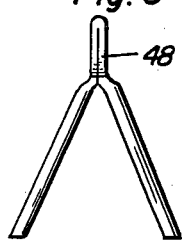
Figure 6 is an enlarged side elevational view of the rod of Figure 5 after the apex thereof has been flattened to form a ground-engaging blade which is generally oval in outline.

Referring now to Figures 5 and 6, it will be seen that the spurs 44 are formed by initially bending a circular cross-sectional rod 46 to have a generally V-shaped appearance. The apex of the V-shaped circular cross-sectional rod 46 is then flattened by a metal working operation to form a flat generally oval shaped blade 48, as is best illustrated in Figure 6. It will be understood that as the wheels 42 rotate their spurs 44 also rotate and the blades 48 dig into the ground adjacent plants and loosen up the earth. The blades 48 dig into the ground to the extent that loose dirt moved inwardly toward the plants by the first set of cultivator shovels 14 has a major portion thereof stopped by the circular wheels 42 with only a small portion passing beneath the same due to the spacing of the wheels 42 from the surface of the ground. The blades 42 will also engage trash, such as cornstalks, etc., and prevent the same from being moved inwardly by the first set of cultivator shovels 14 to damage the young crops.

Referring now to Figure 2 in particular, it will be seen that there is illustrated a transverse portion of the cultivator frame 12 to which is removably connected a two-piece vertical hitch 52. The lower end of the vertical hitch 52 is pivotally connected to the forward end portion 26 of a support arm 24 by a horizontal pivot pin 54. By connecting the rotary cultivator shield 20 directly to a member of frame 12 and utilizing a pivotal connection, it will be seen that the rotary cultivator shield 20 is individually suspended and may ride over obstacles, such as rocks, independently of the action of the cultivator 10 with which it is associated. Attached to the support arm 24 rearwardly of its connection to the hitch 52 is a chain 56 whose upper end is connected to a hydraulic lift mechanism of a tractor (not shown).

Referring now to Figure 9 in particular, it will be seen that the hood-type cultivator shield 22 is of a generally inverted U-shaped cross-section and has a rounded front portion 56. Secured to the top wall 58 of the hood-type shield 22 is a vertically extending bar 60 which is provided with a plurality of vertically spaced apertures 62.

As is best illustrated in Figure 2, the hood-type cultivator shield 22 is intended to be drawn behind the rotary cultivator shield 20 and has its vertically extending bar 60 pivotally secured to the rear end of the support arm 24 by a transversely extending pivot pin 64, the pivot pin 64 being selectively positioned within one of the apertures 62. Inasmuch as the hood-type cultivator shield 22 is preferably pivotally connected to the rotary cultivator shield 20, it will be seen that it is in a sense independently suspended whereby it may ride over obstructions independently of the rotary cultivator shield 20.

While the rotary cultivator shield 20 is necessary in the cultivating of small plants, after the plants have grown a little and the same are cultivated for the second time, the hood-type cultivator shield 22 may be omitted if it is found to be desirable.

Figure 7:
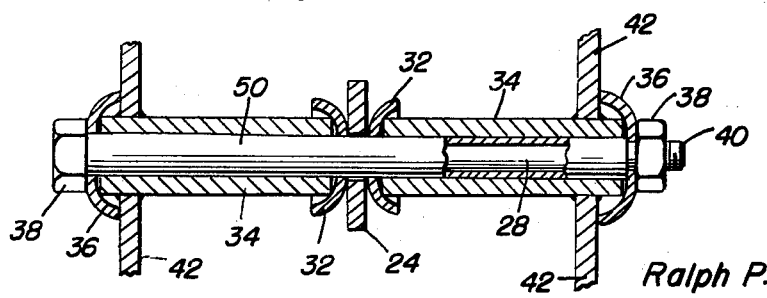
Figure 7 is an enlarged transverse vertical sectional view taken through the center of the rotary cultivator shield and shows the general construction of a shaft thereof and the relationship of the various elements of the rotary cultivator shield with respect to the shaft.

Referring now to Figure 7 in particular, it will be seen that if desired the spacers 30 mounted on the shaft 28 may be omitted to vary the spacing between the circular wheels 42. Also, it will be understood that although it is not shown, the spacers 30 may be made of different sizes whereby the spacing of the wheels 42 may be further varied.

The operation of this device will be understood from the foregoing description of the details thereof, taken in conjunction with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. A rotary cultivator shield comprising a support arm, a transverse shaft carried by said support arm, a pair of rotatable wheels mounted on the end portions of said shaft, each of said wheels having a plurality of circumferentially spaced spurs extending outwardly therefrom, said support arm being pivotally connected to a hitch adapted to be connected to a tractor drawbar, said pivotal connection permitting independent suspension of said rotary cultivator shield for movement in a vertical plane, each of said spurs being generally V-shaped and having flat oval shaped ground engaging blades, said spurs being formed of circular cross-sectional rods with their apices flattened to form said ground engaging blades.

2. A rotary cultivator shield comprising a support arm, a transverse shaft carried by said support arm, a pair of rotatable wheels mounted on the end portions of said shaft, each of said wheels having a plurality of circumferentially spaced spurs extending outwardly therefrom, said support arm being pivotally connected to a hitch adapted to be connected to a tractor drawbar, said pivotal connection permitting independent suspension of said rotary cultivator shield for movement in a vertical plane, said support arm extending rearwardly of said wheels and having connected thereto a hood-type cultivator shield, said hood-type cultivator shield being adjustably pivotally connected to said support arm for independent suspension, whereby said rotary cultivator shield may be vertically adjusted relative said hood-type cultivator shield.

References Cited in the file of this patent

UNITED STATES PATENTS

| | | |
|---|---|---|
| 795,429 | Culbertson | July 25, 1905 |
| 882,667 | Connell | Mar. 24, 1908 |
| 892,465 | Swanson | July 7, 1908 |
| 1,453,891 | Sivley | May 1, 1923 |
| 1,563,291 | Rasmussen | Nov. 24, 1925 |
| 1,835,095 | Schanil | Dec. 8, 1931 |
| 1,880,584 | Tibbitts | Oct. 4, 1932 |
| 2,355,519 | Dunham | Aug. 8, 1944 |
| 2,406,500 | Karl | Aug. 27, 1946 |
| 2,433,199 | Carter | Dec. 23, 1947 |
| 2,447,354 | Morrill | Aug. 17, 1948 |

FOREIGN PATENTS

| | | |
|---|---|---|
| 26,107 | Denmark | June 14, 1920 |